United States Patent [19]

Rothley et al.

[11] Patent Number: 4,506,217
[45] Date of Patent: Mar. 19, 1985

[54] GEAR TOOTH POSITION AND SPEED SENSOR WITH FOUR, BRIDGE CIRCUIT CONNECTED, MAGNETIC RESISTANCE TRACKS

[75] Inventors: Manfred Rothley, Kraichtal; Erich Zabler, Stutensee; Kurt Neuffer; Karl-Franz Reinhart, both of Stuttgart, all of Fed. Rep. of Germany

[73] Assignee: Robert Bosch GmbH, Stuttgart, Fed. Rep. of Germany

[21] Appl. No.: 398,650

[22] Filed: Jul. 15, 1982

[30] Foreign Application Priority Data

Aug. 18, 1981 [DE] Fed. Rep. of Germany ....... 3132549

[51] Int. Cl.³ .................. G01R 33/06; G01B 7/30; G01P 3/44
[52] U.S. Cl. .................. 324/208; 324/174; 324/252
[58] Field of Search ............... 324/173, 174, 207, 208, 324/235, 252; 338/32 R

[56] References Cited

U.S. PATENT DOCUMENTS

| | | | |
|---|---|---|---|
| 3,846,697 | 11/1974 | Cila et al. | 324/174 X |
| 3,917,997 | 11/1975 | Sidor | 324/174 X |
| 4,039,936 | 8/1977 | Jones et al. | 324/208 |
| 4,280,165 | 7/1981 | Pospelov et al. | 324/173 X |
| 4,401,944 | 8/1983 | Narimatsu et al. | 324/252 X |

Primary Examiner—Gerard R. Strecker
Attorney, Agent, or Firm—Frishauf, Holtz, Goodman & Woodward

[57] ABSTRACT

To simplify a field plate effect speed and position sensor, particularly for association with the starter gear of an automotive-type internal combustion engine, four meander-arranged permalloy resistance tracks are located on a substrate at the corners of a rectangle, spaced, in circumferential direction, by about half the pitch distance of the teeth (2) of the starter gear. The resistances can be connected in a voltage divider (FIG. 4) configuration, or in form of a bridge circuit (FIG. 5) supplied from a constant current source (CC) to eliminate temperature variation affects, and providing alternating current output voltages within the wide range of temperature of essentially uniform level as the teeth (2) scan the sensor, a special marker tooth (10) providing an output signal of different level. Preferably, the resistances (5-8) are formed as meander-shaped thin film vapor deposited tracks on a silicon substrate (4), a permanent magnet (9) providing bias magnetization, the direction of which changes with respect to the orientation of the meander tracks—preferably 45° with respect to the direction of rotation (11) to cause the resistance elements to either have high, or low resistances (FIG. 3).

13 Claims, 5 Drawing Figures

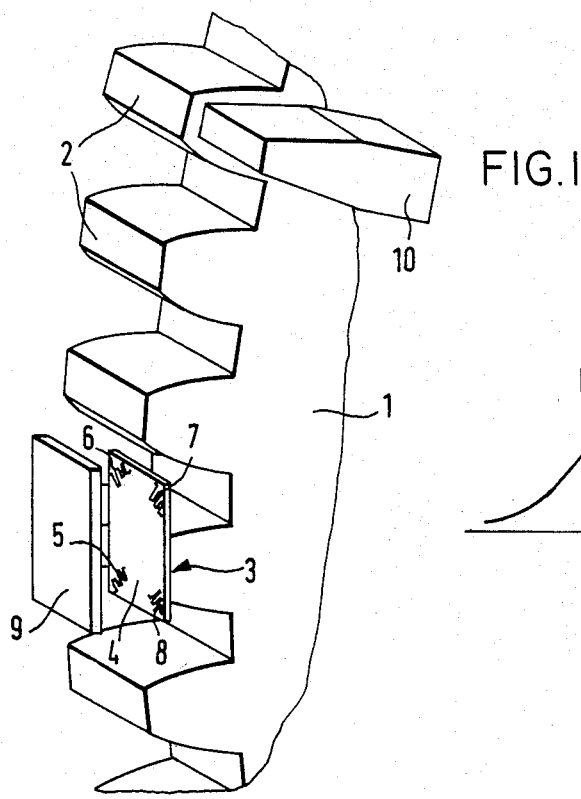
FIG. 1
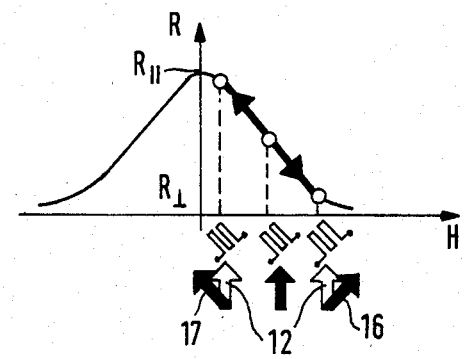
FIG. 3
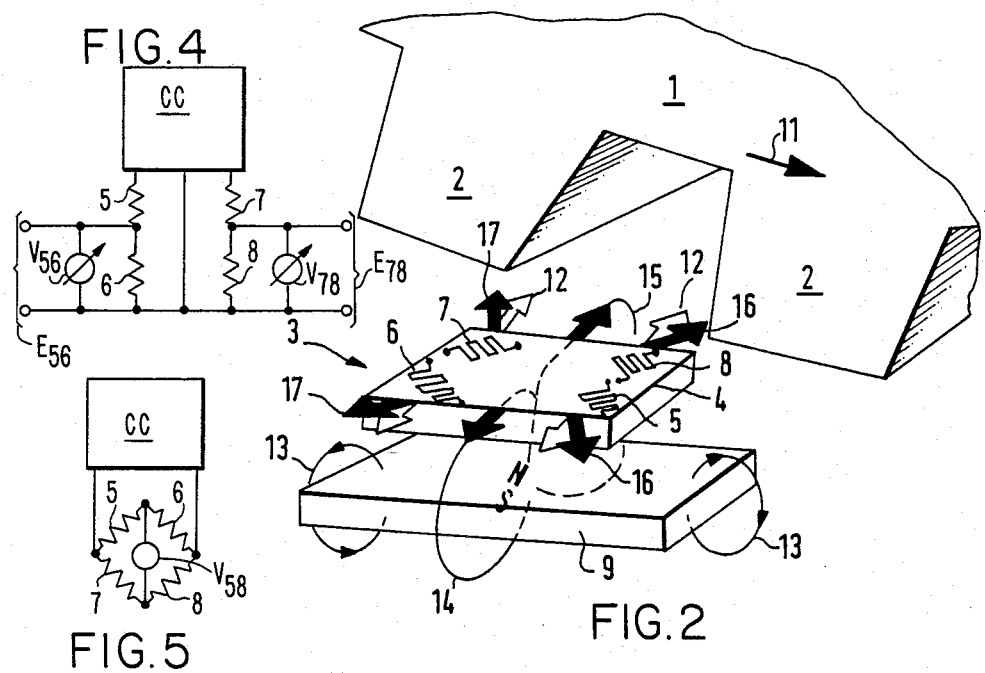
FIG. 4
FIG. 5
FIG. 2

4,506,217

GEAR TOOTH POSITION AND SPEED SENSOR WITH FOUR, BRIDGE CIRCUIT CONNECTED, MAGNETIC RESISTANCE TRACKS

The present invention relates to a magnetic field effect plate position sensor and more particularly to a position sensor using differential magnetic field effect sensing elements to obtain output signals suitable for processing in computer apparatus controlling the operation of automotive-type internal combustion engines.

BACKGROUND

Differential field effect sensing elements are known; they are suitable to determine the speed of rotary elements, or, if desired, the angular position of a shaft, or other rotating element with respect to a reference position which, for example, may be the position of the field effect element as such. Field effect elements are magnetically responsive semi-conductor elements which, usually, have two field plates located on the soft iron pole shoe. A permanent magnet is located at the bottom side of the sensing head, which provides a magnetic bias. If a body of soft magnetic material approaches the facing side of the sensor, the field plates will change their resistance. Such a body may, for example, be the tooth of a gear; if the element is used to determine the speed, or angular position of a crank shaft of an internal combustion engine, and hence of the piston within a cylinder, the gear may, suitably, be the starter gear coupled to the fly wheel of the internal combustion (IC) engine. A detailed description of magnetic field effect sensors is found in the Siemens Data Book 76/77, chapter on "Magnetically Responsive Semi-Conductors" (page 160).

Magnetic field effect sensors are highly temperature sensitive. The field plates are applied to a substrate by adhesives, and high temperatures may interfere with the adhesive quality of the adhesive material, and additionally destroy the meander shape of the field plate resistance elements. Differential field plate sensors, additionally, require high magnetic bias. This, in turn, requires a high quality, and hence expensive, permanent magnet to provide the necessary magnetic bias field.

THE INVENTION

It is an object to provide a position sensor, and more particularly a position sensor suitable for use in automotive-type internal combustion engines which can also be used as a speed sensor, which is simple, essentially independent of temperature, and can be made with commercial magnets of average grade, which are available inexpensively in commerce.

Briefly, four ferro magnetic resistance tracks are located on a substrate positioned at the corners of a rectangle, facing projecting teeth of the rotary element, with two tracks, each, being located adjacent axial ends of the teeth. The spacing of the tracks, in the direction of rotation of the teeth, is matched to the pitch of the teeth, typically such that the spacing of the tracks is half the distance between adjacent teeth so that, when one of the pairs of the tracks is opposite a tooth, the other pair is within the gap of the teeth.

Basically, two tracks suffice, and an output signal can be obtained from a voltage divider circuit. Four tracks, however, are preferred. Two of the tracks can be used to obtain a speed signal, and two further tracks can be used, then, to obtain a special output marker signal, for example, characterizing a particular angular position of the gear, in order to associate output signals with a particular position of a particular cylinder of an internal combustion (IC) engine, for example top dead center (TDC) position of cylinder No. 1.

The system has the advantage that it can be made inexpensively. The resistance tracks are made of permalloy material, and can be easily applied on a substrate by vapor deposition. A cheap, small magnet is all that is needed for magnetic bias, since the required bias field can be kept low. The apparatus can be used over wide temperature ranges, and particularly can be subjected to relatively high temperatures, and is thermally stable. Additionally, the system can be used, selectively, to provide an unambiguious output signal of substantial amplitude or, in the alternative, an unambiguous output signal of somewhat lower amplitude, and in addition a second unambiguous output signal characterizing a particular reference position of the rotating element.

DRAWINGS

FIG. 1 is a schematic perspective, partly fragmentary view of the starter gear of an internal combustion engine, and illustrating the sensor, and biasing magnet, in exploded form;

FIG. 2 is an enlarged exploded view of a portion of the starter gear and the sensor;

FIG. 3 is a graph of a magnetic field, versus resistance of the field plate sensor; and FIGS. 4 and 5 are highly schematic circuit diagrams to obtain an evaluation output signal from the sensor, which is essentially temperature independent,

DESCRIPTION OF THE EMBODIMENTS

The physical basis for the operation of the sensor is based on the magnetic resistance of certain ferro magnetic metal alloys. The electrical resistance of some metal alloys changes with the angle of incidence between a ferro magnetic bias, and current flow within the metal alloy conductor.

A gear 1—see FIG. 1—has a plurality of gear teeth 2 at its circumference. The gear may, for example, be the starter gear of an internal combustion (IC) engine. The sensor 3 is located opposite the teeth. The sensor 3 includes a silicon substrate 4 in which four permalloy resistances 5, 6, 7, 8 are applied in meander shape in the form of resistance tracks, for example, by vapor deposition of permalloy material. A magnet 9 is located parallel to the sensor, spaced by a small distance therefrom. Magnet 9, preferably, is a permanent magnet to provide the required magnetic bias.

The gear 1 may, additionally, have a further tooth, or other magnetic disturbance element 10 located laterally of the gear 1, to provide a reference marker. The outer end surface of the reference marker 10 is at the same level as the end face of the teeth 2 of the gear 1. Other ways of making a reference marker may be used; for example, one of the teeth 2 may be reduced in axial length, for example by about half. This does not interfere with operation of the gear 1 as a starter gear since weakening only a single tooth by partial reduction of the radial extent thereof from the full size to a reduced size, sufficient to reduce the magnet effects therefrom, does not interfere with use of the gear for starting purposes.

Operation, with reference to FIGS. 2 and 3: The resistors 5, 8, are located on the substrate 4 in a very specific manner, namely matched to the geometry of the teeth 2, in the direction of rotation, as illustrated by arrow 11 (FIG. 2). The resistors 5, 6 and 7, 8 are, respectively, spaced from each other by half the distance between two teeth, i.e. half of the distance of the respective center lines of the teeth from each other. Thus, if for example, resistors 6, 7 are exactly over the center line of a tooth, the resistors 5, 8 will be exactly over the center line of a tooth gap. This arrangement provides for maximum amplitude of output voltage. In accordance with a feature of the invention, resistors 5–8 are connected in a bridge circuit (FIG. 5) upon scanning the teeth 2. The output voltage can be obtained as a bridge voltage from a cross-connection, for example as sensed by volt meter $V_{58}$, or otherwise evaluated by an evaluation circuit placed in lieu of the volt meter. The gear 1 is rotated and passes the sensor 3. The resistance of the bridge will change in dependence of the position of the teeth and the tooth gaps as they pass the sensor 3. The output voltage will be a sine-shaped alternating voltage.

The resistance tracks are positioned at an angle of 45° with respect to the direction of rotation 11, as well as with respect to the magnetic bias. The magnetic bias field is illustrated by the open white arrows 12. The resistor will have the highest sensitivity with this geometric configuration, using an angle of 45°. The magnet 9 is located with respect to the substrate 4 by a distance of approximately 5 mm; looked at tangentially with respect to the gear 1, its length should be longer than the distance of the resistors, in that direction, from each other. The increase in length preferably is by factor of 3 in order to locate the field components 13 (FIG. 2) far enough away from the resistors 5, 8, or 6, 7 respectively, so that the magnetic field components 13 will not affect the resistors 5, 8 or 6, 7, respectively. Making the magnet substantially longer than the distances between the resistors 5, 6 or 7, 8 respectively, thus eliminates stray inductance effects. If looked at in an axial direction of the gear 1, the resistors 5, 6, 7, 7 are positioned at the marginal regions of the magnet, so that only the components of the magnetic field 14, 15 will be effective to bias the resistors 5 to 8. The width of the magnet 9 is so selected that the resistor pair 5,6 is subjected to the field component 14, and the resistor pair 7,8, is subjected to the field component 15 (FIG. 2).

The position of the gear 1 selected for illustration in FIG. 2 is such that the resistance tracks 5, 8 are intersected primarily at right angles by the field line 16, as indicated by the heavy black arrows, whereas the resistance tracks 6, 7 are so positioned with respect to the field line 17, that the field line 17 extend in the major direction of the meander tracks formed by the resistance tracks 5,8. The particular arrangement of the resistance tracks is illustrated in FIGS. 2 and 3. Consequently, and as illustrated in FIG. 3 also, the resistance values of the resistors 5, 8 will be substantially less than the resistance values of the resistors 6, 7. Upon rotation of the gear 1, the relative relationship of resistances changes, and resistors 5, 8 will receive a resistance value which will be higher than that of the resistors 6, 7. Change of the field lines from the direction illustrated by arrow 12 to the direction shown by arrows 16, 17, respectively, is caused by approach of the respective teeth 2.

The relationship of field H (abscissa) with respect to resistance (ordinate) is shown in FIG. 3. The relative orientation of the resistance tracks with respect to the field lines is shown below the graph. As can be seen, the resistance is high when the field line 17 affects the resistance track; the resistance is low when the field line 16 intersects the resistance track. The resistance drops as shown in the curve, the resistance varying between two resistance values $R_I$ and $R_{II}$.

For some uses, it is desirable to obtain an output signal specifically associating a predetermined angular reference position of the shaft to which the gear 1 is coupled with an output signal. To recognize the reference marker 10, the sensor 3 is so repositioned that the resistors 5, 6 are located directly beneath the teeth 2, and thus scan passage of the teeth 2 therebeneath, the resistors 7, 8, however, being placed so as to be scanned by the reference marker tooth 10. The connection of the resistors 5, 6 and 7, 8, then, will not be in a bridge connection, but, rather, the respective pair is connected to form a voltage divider or a half bridge—see FIG. 4. The junction between the resistors 5, 6 provides an output voltage which can be determined, for example, on the respective volt meters $V_{56}$ and $V_{78}$, and output signals can be obtained at terminals $E_{56}$ and $E_{78}$. At the junction between the respective resistors 5, 6 and a reference, an alternating current sine-wave is derived; at terminals $E_{78}$, a voltage pulse will be derived for each rotation, which will be generated by change of the resistance value of the resistor 7, 8, as the reference marker tooth 10 passes therebeneath.

Ordinarily, a permalloy resistor has substantial temperature dependence, with a positive temperature coefficient. For compensation, the resistors are preferably operated always in pairs, and in voltage divider operation. By supplying a constant current to the respective voltage dividers or the bridge circuit, derived, for example, from a constant current source CC, compensation of temperature dependence of the sensor resistors is largely obtained, so that the sensor 3 can operate without substantial change in output voltages over a wide range of temperature. The upper temperature limit of the sensor is at over 200° C., which is satisfactory for most applications, and suitable for practically all applications when applied to automotive internal combustion engines.

Various changes and modifications may be made within the scope of the inventive concept.

We claim:

1. Magnetic field effect position sensor, to sense the position of a rotating body (1), having magnetically permeable projecting teeth (2,10) of ferro-magnetic material and a reference position means (10), with respect to the sensor (3), comprising a stationary permanent magnet (9) providing a bias field;

a substantially non-conductive substrate (4) in the form of a rectangle and mounted within said bias field in fixed relation to said magnet;

four ferro-magnetic resistance tracks (5–8) located on the substrate, each positioned, at a different corner of the rectangle at an angle of approximately 45° to the direction of rotation of said body and facing the projecting teeth, with two tracks (5,6; 7,8) each being located adjacent respective axial ends of the teeth, and the spacing of the tracks, in the direction of rotation of said body, being matched to the pitch of the teeth, said tracks being connected together so as to produce a rotary speed signal and a signal representative of passage of said reference means (10) past said substrate.

2. A sensor according to claim 1 wherein the tracks are applied to the substrate in a meander pattern.

3. A sensor according to claim 1 or 2 wherein the tracks extend from the respective corners of the rectangle at an angle of about 45°, the rectangle having sides which are, respectively, parallel to the axis of rotation of the rotating body, and a plane transverse to the axis of rotation of the rotating body.

4. A sensor according to claim 1 wherein said magnet (9), intangential direction with respect to said rotating body, is longer than the spacing between resistance tracks on said substrate, intangential direction.

5. A sensor according to claim 1 wherein said resistance tracks comprise permalloy tracks on the substrate.

6. A sensor according to claim 1 wherein said resistance tracks comprise meander-shaped vapor-deposited thin film permalloy tracks extending at an angle of 45° with respect to the axis of rotation of said body.

7. A sensor according to claim 1 wherein the distance, in tangential direction with respect to the direction of rotation (11) of respective resistors at the corner of said rectangle or configuration is approximately half the pitch distance of the projecting teeth (2).

8. A sensor according to claim 1 wherein the teeth on the body comprise regularly spaced circumferentially positioned teeth (2) and an additional reference marker tooth (10);

and wherein two resistance tracks (5, 6) of said four tracks are positioned in alignment with respect to the regularly spaced teeth (2) and two other resistance tracks (7, 8) are positioned in axial alignment with respect to said marker tooth (10).

9. A sensor according to claim 1 wherein the teeth on the body comprise regularly positioned teeth (2);

and wherein the four resistance tracks (5-8) are positioned in alignment with respect to said regularly spaced teeth.

10. A sensor according to claim 9 wherein oen of said regularly spaced teeth includes a marker tooth (10) positioned for magnetic field interaction with respect to said permanent magnet (9) to change the magnetic field upon passage of said market tooth with respect to the magnetic field upon absence of said marker tooth.

11. A sensor according to claim 1 wherein said resistance elements are connected in a bridge circuit;

and a constant current source (CC) is provided supplying current at an essentially constant level to said bridge circuit, regardless of variation of resistance of said tracks under changing temperature conditions.

12. A sensor according to claim 1 wherein each two resistance tracks which are in axial alignment with respect to each other are connected in a voltage divider circuit;

and a constant current source (CC) is provided, supplying current to the voltage divider circuits formed by the resistance tracks to provide essentially uniform output signals regardless of change of ambient temperature conditions across the voltage divider portions of the resistance tracks.

13. A sensor according to claim 11 or 12 wherein the spacing of the resistance tracks, in a direction tangential to said rotating body is approximately half the pitch distance between the teeth (2) of the rotating body.

* * * * *